(12) United States Patent
Lustenberger

(10) Patent No.: US 10,139,264 B2
(45) Date of Patent: Nov. 27, 2018

(54) ELASTICALLY DEFORMABLE LOAD BEARING STRUCTURE COMPRISING A MEASURING ASSEMBLY FOR THE LOAD

(71) Applicant: DIGI SENS AG, Murten (CH)

(72) Inventor: Martin Lustenberger, Villars sur Glane (CH)

(73) Assignee: DIGI SENS AG, Murten (CH)

( * ) Notice: Subject to any disclaimer, the term of this patent is extended or adjusted under 35 U.S.C. 154(b) by 0 days.

(21) Appl. No.: 14/889,784

(22) PCT Filed: May 5, 2014

(86) PCT No.: PCT/CH2014/000061
§ 371 (c)(1),
(2) Date: Nov. 6, 2015

(87) PCT Pub. No.: WO2014/179897
PCT Pub. Date: Nov. 13, 2014

(65) Prior Publication Data
US 2016/0103011 A1 Apr. 14, 2016

(30) Foreign Application Priority Data

May 8, 2013 (CH) .................................... 934/13

(51) Int. Cl.
*G01L 1/04* (2006.01)
*G01G 1/18* (2006.01)
(Continued)

(52) U.S. Cl.
CPC .............. *G01G 1/18* (2013.01); *B60P 1/6409* (2013.01); *B60P 1/6463* (2013.01); *B62D 33/02* (2013.01);
(Continued)

(58) Field of Classification Search
CPC . G01N 3/02; B61B 12/06; G01G 1/18; G01G 19/08; G01G 21/161; B60P 1/6409;
(Continued)

(56) References Cited

U.S. PATENT DOCUMENTS 2,219,361 A * 10/1940 Haberstump ........... F16H 51/00
 123/90.39
2,532,905 A * 12/1950 Hall ......................... F01L 1/22
 74/470

(Continued)

FOREIGN PATENT DOCUMENTS

JP 2008 002913 A 1/2008
WO WO-2012106826 A1 8/2012

OTHER PUBLICATIONS

Koch, Florian, International Search Report for PCT/CH2014/000061, dated Jun. 16, 2014 (4 pages).

*Primary Examiner* — Jonathan Dunlap
*Assistant Examiner* — Octavia Hollington
(74) *Attorney, Agent, or Firm* — Winstead PC

(57) ABSTRACT

An elastically deformable load bearing structure includes a measuring arrangement for measuring a magnitude of a load acting on the load bearing structure in a loadable section. A mechanical transmission element extends from the loadable section to a measuring section of the load bearing structure and cooperates operatively with a sensor. The sensor is arranged in the measurement section. The mechanical transmission element is constructed as a pivotable rocker supported by a rocker bearing positioned inside a length of the transmission element.

14 Claims, 7 Drawing Sheets

Figure 1A:
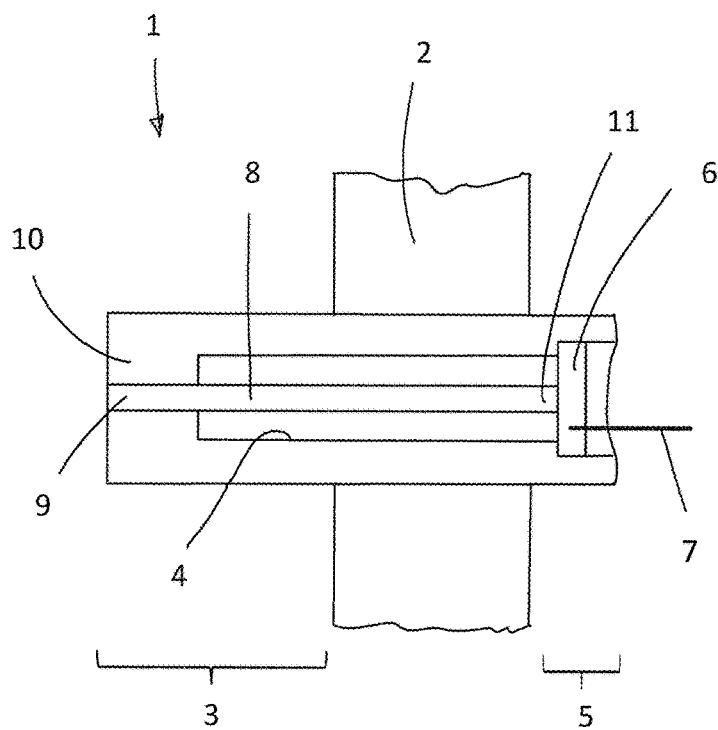

(51) Int. Cl.
*G01G 21/16* (2006.01)
*G01L 5/00* (2006.01)
*B60P 1/64* (2006.01)
*B62D 33/02* (2006.01)
*F16L 3/18* (2006.01)
*G01G 19/08* (2006.01)
*G01G 19/12* (2006.01)
*G01G 19/18* (2006.01)

(52) U.S. Cl.
CPC ............... *F16L 3/18* (2013.01); *G01G 19/08* (2013.01); *G01G 21/161* (2013.01); *G01L 5/00* (2013.01); *G01L 5/0014* (2013.01); *G01G 19/12* (2013.01); *G01G 19/18* (2013.01)

(58) Field of Classification Search
CPC .......... B60P 1/6463; B62D 33/02; F16L 3/18; G01L 5/00; G01L 5/0014
USPC ..................................................... 73/862.637
See application file for complete search history.

(56) References Cited

U.S. PATENT DOCUMENTS

| | | | |
|---|---|---|---|
| 3,488,997 A | | 1/1970 | Kliever |
| 4,095,660 A | | 6/1978 | Johansson |
| 4,361,199 A | | 11/1982 | Ulicny |
| 4,744,429 A | * | 5/1988 | Kellenbach .......... G01G 3/1402 177/211 |
| 5,998,742 A | * | 12/1999 | Liu .......................... G01G 7/02 177/184 |
| 6,851,321 B2 | | 2/2005 | Fuchs |
| 9,014,818 B2 | * | 4/2015 | Deterre ................ A61N 1/3975 607/116 |
| 9,442,026 B2 | * | 9/2016 | Mol .......................... G01L 1/06 |
| 9,468,999 B2 | * | 10/2016 | Lustenberger ....... B23Q 1/0054 |
| 2012/0035770 A1 | * | 2/2012 | Lustenberger ........... F16M 7/00 700/275 |

* cited by examiner

ELASTICALLY DEFORMABLE LOAD BEARING STRUCTURE COMPRISING A MEASURING ASSEMBLY FOR THE LOAD

The present invention relates to a load bearing structure according to the preamble of claim 1, a lorry equipped with such a load bearing structure according to claim 12, and a cableway car according to claim 14.

It is often necessary to measure a load acting on a load bearing structure in real time. One particular application occurs in the area of lorries and cableways, and in a wide range of engineering fields.

Transported goods are often collected in skips or containers and the corresponding container is then picked up and transported by a lorry, and unloaded again at the destination. As a rule, the weight of the receptacle that is filled and loaded onto the lorry is not known, so the permitted total weight of the lorry may be exceeded inadvertently. And it may be essential to determine the weight of a receptacle or the transport load in order to calculate transport costs or for other purposes.

Weighing systems for lorries at the respective loading or destination location are often not available, which causes particular difficulty in the case of the gross vehicle weight, because by the time the lorry reaches a weighing system it has completed an impermissible journey (in the event of overload) and returning to the starting point to reduce the transport weight is uneconomical.

Skips are lifted onto the loading surface of a lorry by means of a suspended boom attached to the lorry, as are waste containers, for example, which are grabbed by correspondingly equipped refuse vehicles via pivotable supports in front of the front end of the refuse vehicle, hoisted over the driver's cab and then tipped into the loading space of the refuse vehicle from above. Solutions for measuring the weight of the charged load have become known in this environment, but they cannot be applied in other situations because for a moment during the loading operation the load is suspended solely from the lifting members and supported thereby. The weight is measured during that moment.

However, more and more containers are being transported, representing a much greater transported weight than the skips, and also having considerably larger dimensions so that the loading systems for skips and smaller transport receptacles are inadequate.

Typically, the container is gripped at the front end by the hook of the lifting device, raised over the lip of the lorry's loading surface and pulled onto the surface. In so doing, the bottom of the container scrapes over the lip of the loading surface, which is typically equipped with rollers for this reason. In this much more efficient loading process, the load lifting device does not have to be able to support the full weight of the container, and the difficult operation of attaching the container to the lifting device, as would be necessary for one that was suspended freely during loading, is no longer required.

In this application, suggestions have become known to provide the superstructure of the lorry with measuring cells to measure the weight of the loaded load, but these entail costly installation work on the chassis, and corresponding effort in the event of repair (removal of the superstructure). Such an embodiment is disclosed in JP 2008-002913 by Shin Meiwa Ind. Co. Ltd. The expense associated with this embodiment is considerable, since load cells must be fitted in the chassis, which cells must support the full weight of a container (up to 40 t or more), and deliver accurate readings at the same time.

Suggestions have also become known to arrange the rollers on stub axles, of which the deflection under load is detected by strain gauges and associated with a weight. For this purpose, strain gauges are inserted in the hollow stub axle and fastened to the inside wall in a superimposed criss-cross arrangement. A disadvantage of this solution is that the inner diameter of the stub axle is necessarily large, and mounting of strain gauge in the interior of the stub axle is difficult and time consuming.

Accordingly, it is the object of the present invention to provide a device that makes it possible in simple manner to determine the weight bearing on a load bearing structure such as an stub axle.

This object is achieved by the characterizing features of claim 1.

Since a mechanical transmission element is used, the bore in the load bearing structure may have a small diameter. Since the sensor is disposed in a measuring section, that is to say distant from the loadable section, it may be disposed at a suitable location, in other words it can be fitted with little effort. Overall, a simple, inexpensive arrangement of small dimensions is provided.

Particular embodiments are described in the dependent claims. For example, measurement accuracy can be increased by the corresponding modifications of the invention, in particular independently of the load bearing point, since this often distorts the measurement result.

Although the invention is presented in the form of a container to be transported by a lorry or as a cable carrier of a cableway, its scope of application extends to all sorts of other uses in which the load acting on a loadable section of an elastically deformable load bearing structure is to be determined.

Figure 1B:
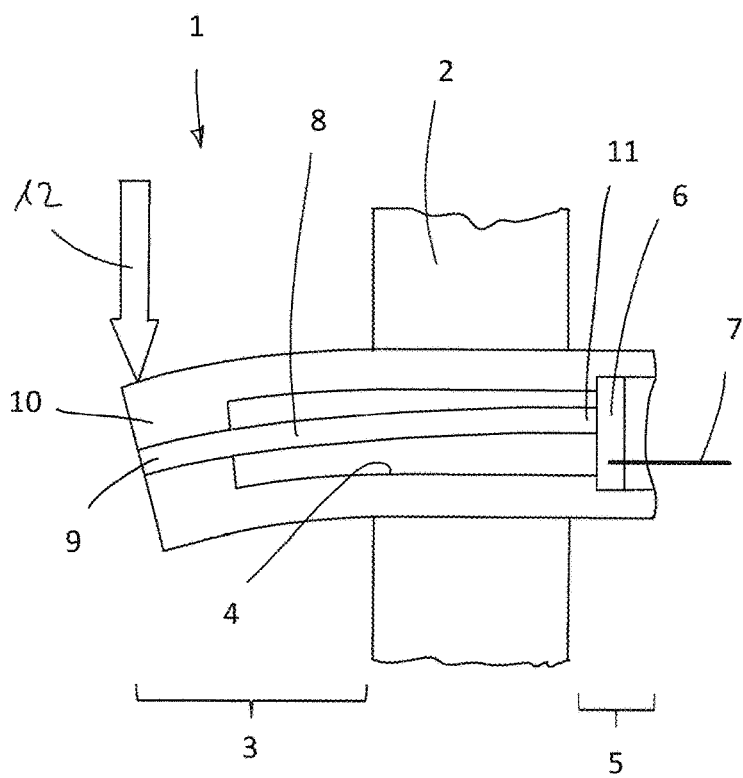
Figure 2:
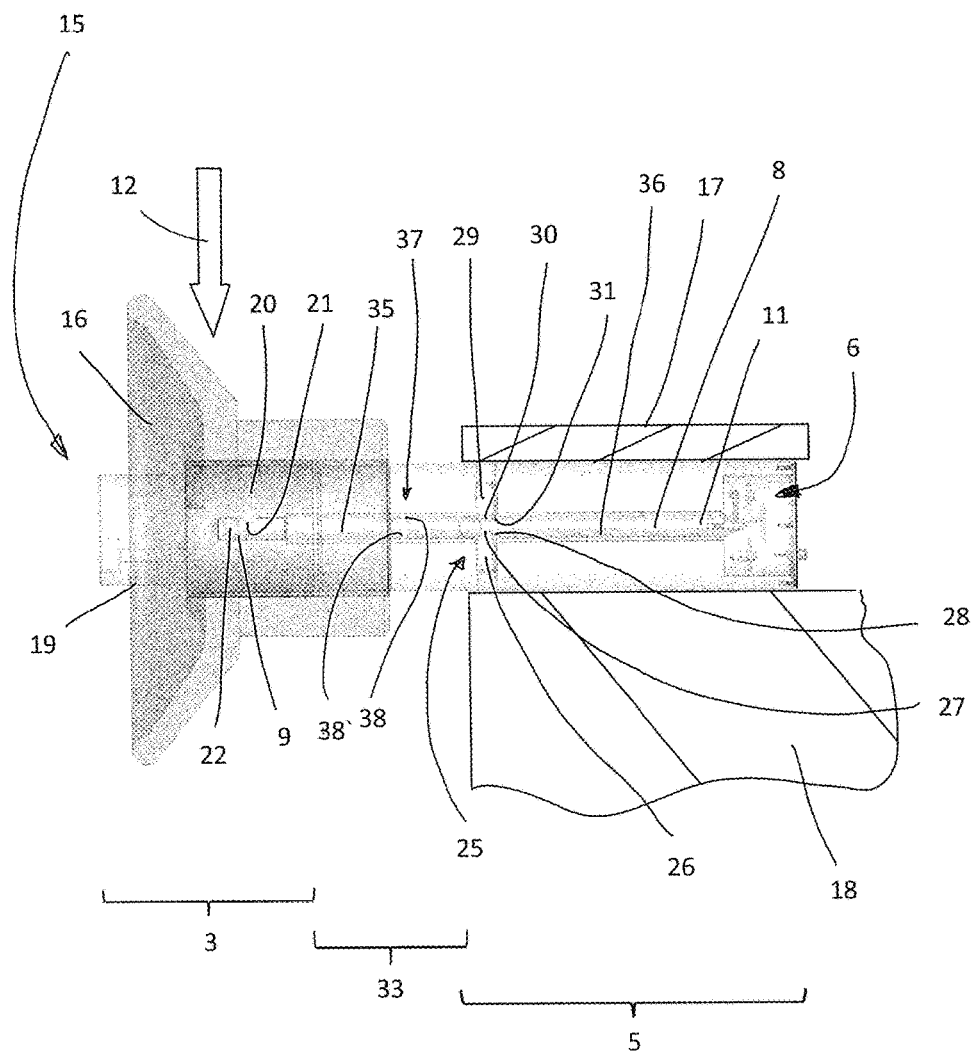
Figure 3A:
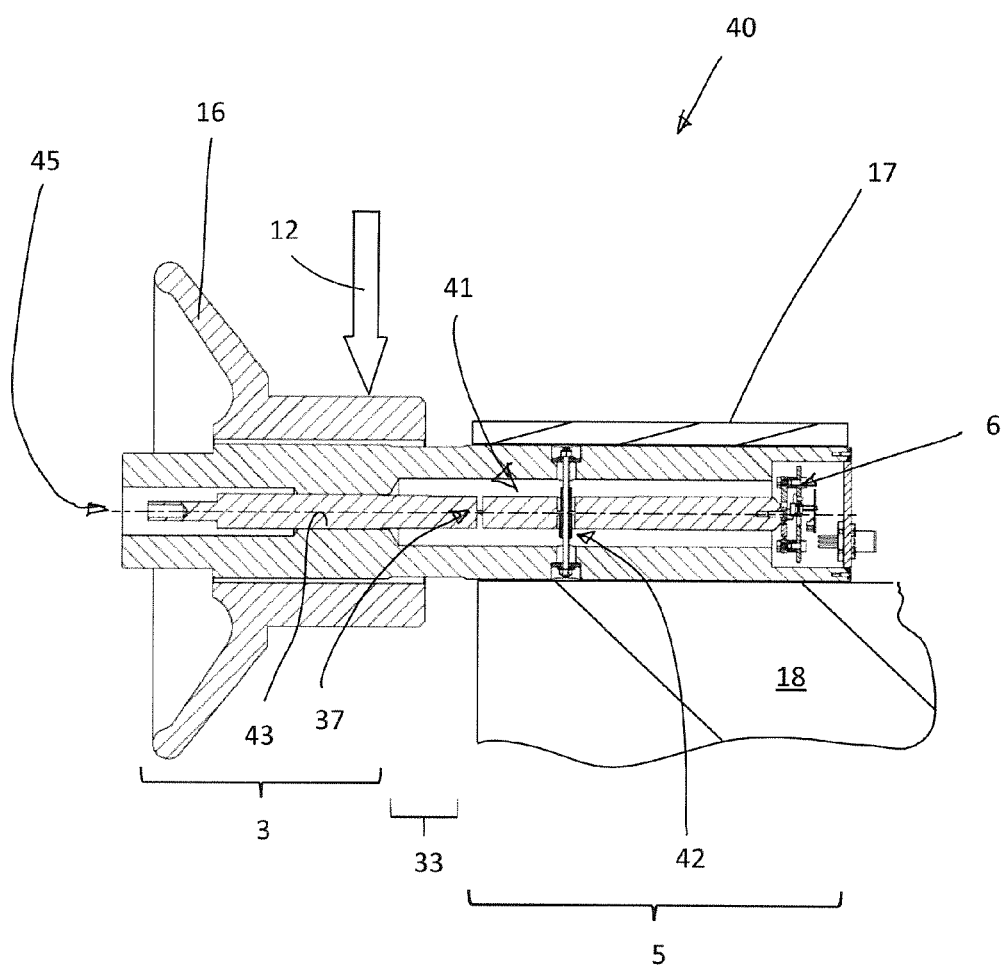
Figure 3B:
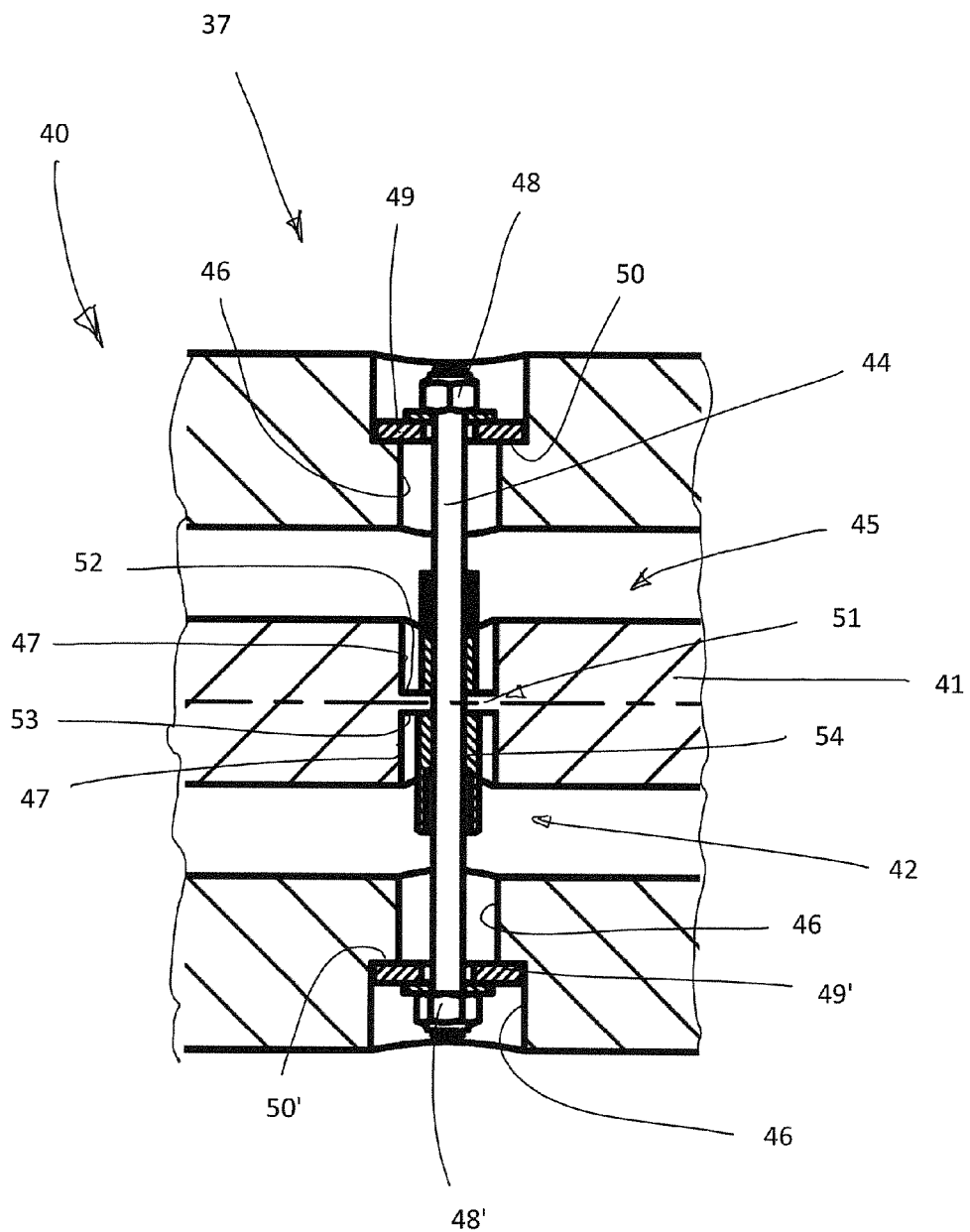
Figure 3C:
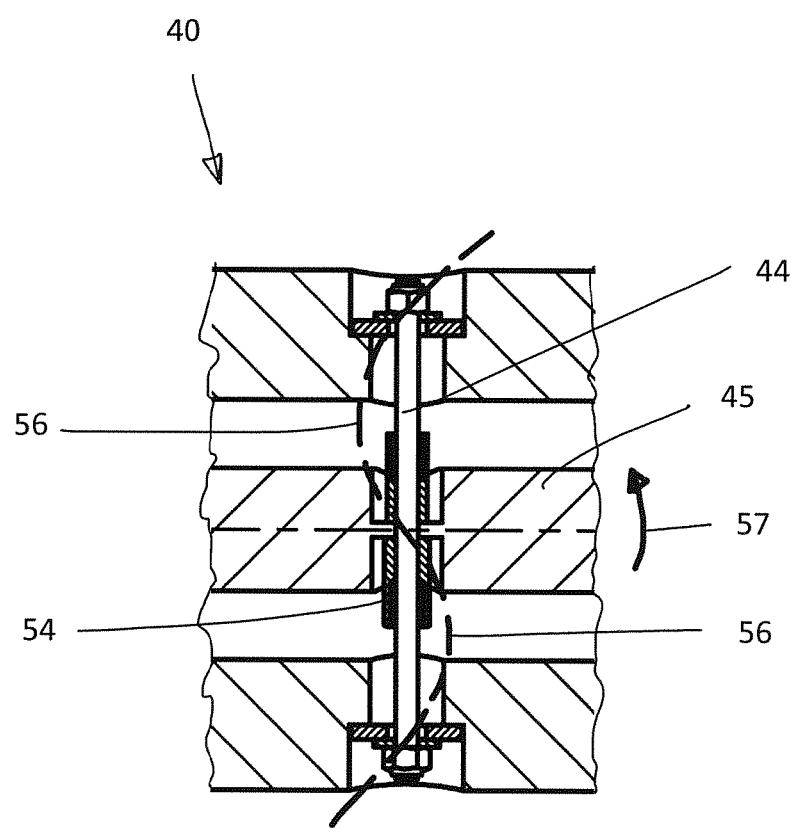
Figure 4:
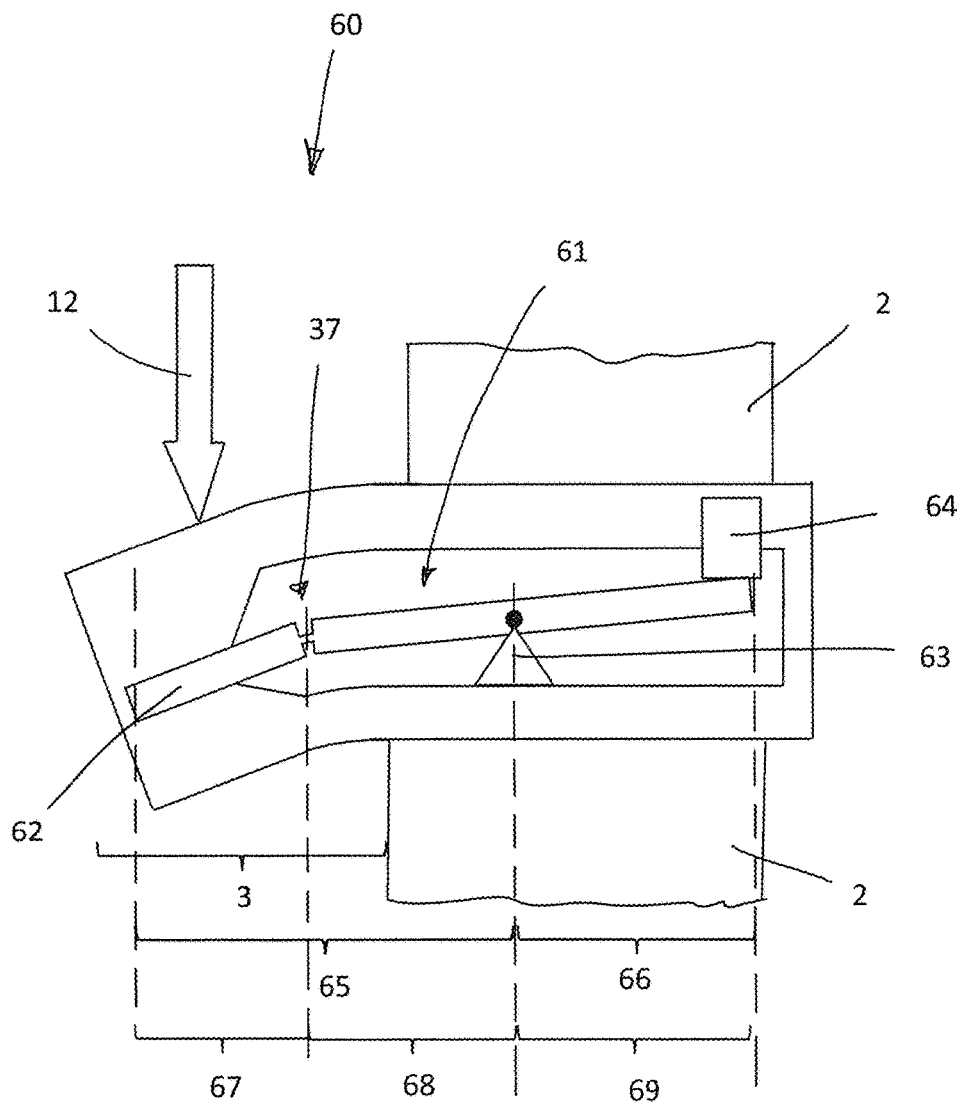
Figure 5A:
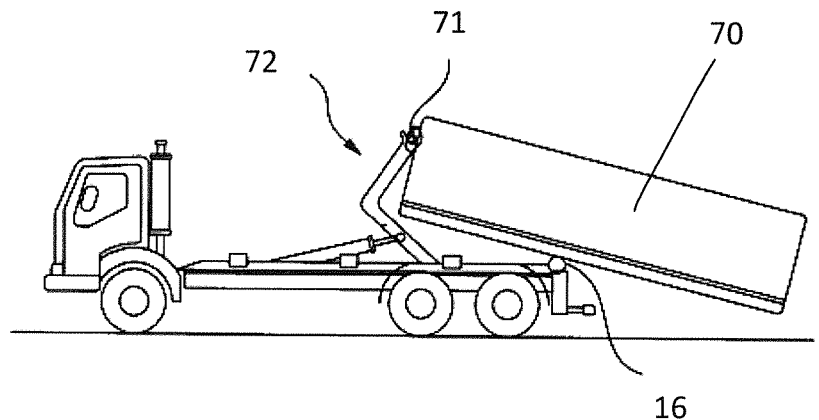
Figure 5B:
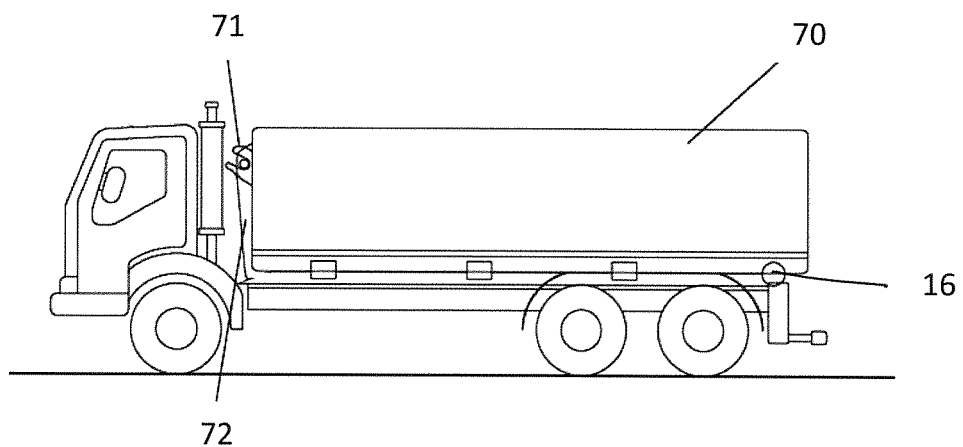

The invention will be explained in greater detail in the following with reference to the figures. In the drawing:

FIG. 1a is a schematic representation of a cross section through a basic embodiment of a load bearing structure with a measuring arrangement according to the invention, FIG. 1b shows the load bearing structure of FIG. 1a under a load, FIG. 2 is a schematic representation of a cross section through a second inventive embodiment of a load bearing structure with a measuring arrangement according to the invention, FIG. 3a is a schematic representation of a cross section through a third, preferred embodiment of a load bearing structure with a measuring arrangement according to the invention, FIG. 3b shows an enlarged detail of FIG. 3a at the site of the rocker bearing, FIG. 3c is a schematic representation of the course of the deflection curve of the rocker bearing of FIG. 3a, FIG. 4 is a schematic representation, enlarged for improved visibility, of the principle of operation of the preferred embodiment of FIG. 2, or 3a to 3c in the loaded state, and FIGS. 5a and 5b are schematic representations of a lorry equipped according to the invention.

FIG. 1a is a schematic representation of a cross section through a load bearing structure 1, a stub shaft for example, constructed according to the invention, a projecting plate or component of any kind, which is clamped in a bracket 2 and thus held in place at this point. A loadable section 3 of load bearing structure 1 protrudes from clamp 2. In the figure, the length of projecting section 3 is adapted to satisfy the needs of representing the invention, and may be different, that is to say longer or shorter, depending on the current machine element or component. A cavity 4 (a bore, for example) is provided inside load bearing structure 1, which cavity extends from the loadable section 3 through the middle thereof and as far as a measuring section 5 of load bearing structure 1 located at a distance from loadable section 3, and in which a sensor 6 is arranged. A data link 7 for the measurement signals from sensor 6 leads for example to a computer (not shown in order to maintain the clarity of the figure), which processes the measurement signals.

A transmission element, here in the form of a rod 8, is clamped by its left end 9 to the (left) end 10 of loadable section 3 and extends through cavity 4 as far as sensor 6, to which the right end 11 of rod 8 is operatively coupled. Here, rod 8 or the transmission element runs approximately in the range of the longitudinal axis of load bearing structure 1, although a different position also falls within the scope of the invention.

FIG. 1b shows the load bearing structure of FIG. 1a under a load 12 which is symbolised by the arrow and causes the elastic load, bearing structure 1 to bend in the direction of the load, so that end 9 thereof is deflected downward and tilted in slightly translation manner. This also causes rod 8 to be deflected from its original position, and this now extends upward and to the right, wherein the right end 11 thereof acts on sensor 6 as a result of this deflection, and the sensor generates a measurement signal corresponding to this effect. Sensor 6 is preferably designed as a vibrating wire sensor, known per se to a person skilled in the art, and itself has an elastically deformable frame, on which rod 8 acts, deflecting it according to load 3, which deflection is detected by the vibrating wire sensor, which generates the measurement signal.

The deformation of load bearing structure 1 and thus also the deformation of rod 8 and the deformation path of loadable section 3, that is to say the left end 10 of load bearing structure 1 is shown in exaggerated form in FIG. 1b.

In summary, the FIGS. 1a and 1b generally represent an elastically deformable load bearing structure 1 with a measuring arrangement for the magnitude of a load 11 acting on load bearing structure 1 in a loadable section 3, wherein a mechanical transmission element (rod 8) is provided and extends from loadable section 3 to a measuring section 5 of load bearing structure 1 and cooperates operatively with a sensor 6 which is arranged in measurement section 5.

FIG. 2 shows a cross section through a further embodiment of the inventive load bearing structure which here has the form of a stub axle 15, supports a roller 16 and is braced on a chassis 18 of a lorry, indicated schematically, via a clamp 17, also represented schematically. This configuration may exist for example with a lorry that can load containers, see FIG. 5 below in this regard. At this point, it should be noted that in the figures reference is made to metal load bearing structures, but the application of the invention would also be conceivable for elastic, preferably hard non-metallic materials. It also falls within the scope of the invention to position the transmission element outside of the load bearing structure, although of course the arrangement shown is advantageous.

A number of channels 19 for lubricating the roller are shown, as well as a pin 20, which itself engages in a groove 21 of the transmission element (generally preferably an elongated body), which is in the form of a rod 8 and so holds it in position. The left end of rod 8 is clamped in loadable section 3 of the stub axle, shown here inserted in a bore 22 without clearance, so that any deformation (translation/tilting) of loadable section 3 of the stub axle 15 caused by load 12 is transmitted to rod 8.

Also shown is a rocker bearing 25 for the transmission element in the form of rod 8, which causes the rod 8 to perform a rocking motion when loadable section 3 is deflected, that is when the left end 9 thereof sinks and right end 11 rises or attempts to rise under the effect of a load (and vice versa when the load is removed), depending on the configuration of the sensor 6, which may or may not allow left end 11 to rise (or fall).

As mentioned previously, sensor 6 may be in the form of a vibrating wire sensor, a strain gauge or some other sensor. If sensor 6 is itself deformable, left end 11 rises or falls, if sensor 6 is not deformable (e.g., pathless force measurement) left end 6 remains in position, in which case rod 8 is deflected elastically according to load 12. The rocker bearing has a bearing pin 26 which has a ball bearing 27 at the end thereof, and which engages in a recess 28 in rod 8 provided for this purpose, so that the rod it supported pivotably. A counter-pin 29 with a suitably constructed ball bearing 30 engages in a recess 31 in rod 8 provided for this purpose and holds it in position during operation so that it cannot lift away from bearing pin 26, for example.

Roller 16 rests on a subsection of stub axle 15, specifically up to the point where a bearing or bushing 31 establishes a connection between the inner bore 32 of roller 16 and the stub axle. In the embodiment shown, this subsection constitutes the loadable section of stub axle 15. The other subsection of stub axle 15 attached to lorry chassis 18 by means of clamping 17 forms measuring section 5.

Regarding stub axle 15, the result is that due to clamp restraint 17 and bush 31 it is stiffened over the length of the loadable section 3 and the length of measurement section 5, but not over the length of a deformation section 33 that is not restrained by clamping.

Stiffening makes the measurement of load 12 more difficult, because this ultimately depends on the deformation path of loadable section 3. In general, larger deformation makes higher resolution of the measurement results accessible and simpler from a design engineering point of view, so it can be achieved with less effort. Deformation section 33 now enables the deformation path of loadable section 3 to be adapted to the desired degree, as a stiffener is not present in deformation section 33.

In summary, a deformation section 33 is provided between loadable section 3 and measuring section 5, and this deformation section is elastically deformed during operation under the effect of load 12, causing a relative displacement between loadable section 3 and measuring section 5. The person skilled in the art can now adapt the length of the deformation section 33 to the desired measurement accuracy or even omit it entirely, depending on the specific configuration, and in particular with regard to the sensor 6 used.

The transmission element, which is shown as a rocker in the figure, is preferably mounted in measuring section 5, that is to say rocker bearing 25 is located particularly preferably on the end of measurement section 5 on the left here, in the transition of the stiffened subsection of stub axle 15 section to the freely deformable section 33 thereof.

The arrangement shown in FIG. 2 forms (as opposed to the arrangement according to FIGS. 1a and 1b) a beam balance, of which the beam (i.e., the transmission element here in the form of rod 8) is mounted on a horizontal axis (i.e. on rocker bearing 25). The rod is in balance when the torques generated by load 12 and the response of sensor 6, are in equilibrium. Consequently, the lengths of the corresponding lever arms of rod 8 are significant, namely the length of the load arm 35 between the clamping by bore 22 and rocker bearing 25 on the one hand and the length of measuring arm 36 from rocker bearing 25 to sensor 6 on the other. The length of measuring arm 36 is constant for design engineering reasons, the physical length of load arm 35 is also constant, but the deflection of load arm 35 depends on the point where the load is applied, which may vary more or less depending on the circumstances. Thus, the reaction of measuring arm 36 varies not only if the load varies, but also—undesirably—according to the point where the load comes to bear.

It follows that in the present case (and similarly also in the arrangement according to FIGS. 1a and 1b), the measurement result is distorted when the load is not applied at exactly the predetermined location.

In the transmission element, which is shown here as rod 8, a mechanical filter 37 is therefore provided for the load related bending moments, in such manner that during operation only the shearing force corresponding to load 12 is transmitted from load-bearing section 3 to the measuring section. Since the shearing force is independent of the location of the load application, filter 37 prevents a corresponding distortion of the measurement result.

Mechanical filter 37 preferably has a weak point, provided in the case shown in the transmission element and constructed as a rod 8, and which in the embodiment shown has two the recesses preferably in the form of slots 38, 38'. The weak point forms an elastic joint and allows mechanical buckling of the transmission element. The slots 38, 38' according to the embodiment shown in the figure allow said elastic buckling of rod 8.

The function of mechanical filter 37 is described in greater detail later with reference to FIG. 4.

FIG. 3a shows an alternative embodiment of the load bearing structure according to the invention, which, as in FIG. 2, is constructed as a stub axle 40 for exemplary purposes, so it supports a roller 16 and is attached to a lorry chassis 18.

The embodiment shown in FIGS. 1a and 1b allows the load 12 to be measured according to the invention and often with sufficient basic accuracy. The embodiment shown in FIG. 2, in which the transmission element is designed as a rocker, results in greater measurement accuracy for load 12 but still has a disadvantage in that the friction arising in rocker bearing 25 between ball bearing 27 and recess 28 causes hysteresis of the measurement values, which can affect the results slightly. This remaining drawback is avoided in the embodiment of FIG. 3a.

The arrangement shown in FIG. 3a is constructed similarly to that of FIG. 2. A transmission element in the form of a rod 45 extends through stub axle 40, is clamped at one end by means of a narrowing 43 of the bore in stub axle 40 and at the other end interacts operatively with sensor 6. A rocker bearing 41 has a spiral spring arrangement 42 with a flexible spring 44 (FIG. 3b) which now supports rod 45 for the rocking movement practically without friction.

FIG. 3b shows an enlarged detail from FIG. 3a at the location of rocker bearing 25. Flexible spring 44 is preferably designed as an elastically bendable rod, but can also have, any other suitable configuration. In the embodiment shown it protrudes through a bore 46 in stub axle 40 and through a bore 47 that is aligned therewith and extends through rod 45. Flexible spring 44 is fixed in bore 46 with the aid of nuts 48, 48 screwed to the end thereof, which rest on washers 49, 49', which in turn rest on stages 50, 50 of bore 46 and thus fix flexible spring 44 on stub shaft 40.

Bore 47 in rod 45 is continuous, but it has a narrowing 51 that forms an upward ridge 52 and a downward ridge 53. A bush 54 abuts ridge 53, and is in turn bolted to flexible spring 44 and thus attached in fixed manner thereto. The transmission element constructed as rod 45 thus rests with its ridge 53 on the bush 54 fixed to spiral spring 44 and is thus supported by spiral spring 44. A counter bushing 55 is also bolted to spiral spring 44, abuts against upper ridge 52, possibly with a tolerance, and so holds rod 45 in position.

FIG. 3c shows the dashed (and heavily) drawn S-shaped bend line 56 of spiral spring 44 if rod 45 is tilted in the direction of arrow 57. If it is tilted in the opposite direction of arrow 57, bend line 56 will change course accordingly.

It follows that rocker bearing 41 has a spiral spring arrangement 42 that passes through the transmission element and by its deflection allows the rocking motion of the transmission element. Thus, the rocking motion is without hysteresis, since the damping of spiral spring 44 is not relevant to the present measurement while it is bending.

FIG. 4 shows the function of mechanical filter 37 (see earlier description of FIG. 2 on this subject) in detail. As in FIG. 1, a load bearing structure 60 is clamped in a holder 2 and held firmly thereby. A load 12 whose loadable section 3 bent downward (any deformation section is omitted to simplify the figure). The transmission element, again in the form of a rod 61, is clamped in loadable section 3 by the left end 62 thereof, comprises a mechanical filter 37 for bending moments, is mounted pivotably on rocker bearing 63 and cooperates operatively with sensor 64.

As mentioned earlier with reference to FIG. 2, rod 61 corresponds to the beam of a balance scale with a load arm 65 and a measuring arm 66.

Depending on the point at which the load is applied, to the transmission element, here in the form of a rod 61, load 12 causes a bending moment that varies of the length thereof and a constant shearing force. The bending moment that builds up in the clamped section 67 of rod 61 is now not transmitted to its load section 68, as the rod buckles at the place of the filter 37. However, the shearing force prevailing in the clamped section 67 is still transmitted to load section 68. This shearing force now acts on load section 68, which has a structurally defined constant length, as is the case with measuring section 69. As a result, the only force still acting on load section 68 is the shearing force, so that the mechanical filter has at least substantially filtered out the effect of the bending moment (an insignificant residual torque is still unavoidably transmitted by the elastic connection between the sections 67, 68). The mechanical filter is thus designed such that during operation only shearing forces corresponding to the load are transmitted from the section for detecting the load to the measurement section.

Accordingly, it also falls within the scope of the invention to construct the mechanical filter as a hinge with a horizontal axis of rotation, for example as a horizontal axle to which eyes of the two sections are connected in articulated manner. For small structures, however, a buckling point is preferable.

In summary, mechanical filter 37 has a weak point in the transmission element, which in turn has a section of reduced thickness, which is preferably located in the area of the neutral axis of the transmission element when viewed in the direction of load application.

FIG. 5a shows a lorry that is loading or unloading a container 70 using a known hooking device 71 having a hook 70 that engages in container 70, wherein the container is moved on rollers 16 (FIGS. 2 and 3), which are weighted accordingly. FIG. 5b shows the lorry of FIG. 5a loaded with a container 70. Preferably, one roller 16 is provided along the length of each side of the lorry, and is arranged on an inventively embodied stub shaft 15, 40 (FIGS. 2 and 3a-3c), and allow precise measurement of the weight of the container bearing down on them. According to the invention, it is further provided that hook device 72 is also equipped with a weight sensor. Then, the weight of the container 70 can be detected at three points, namely at the two rollers 16 on the hook 71 of hook unit 72 and are recorded and evaluated in real time by means of a computer arranged suitably on the lorry. A suitably configured hook device is described in WO 2012/106826. It should be noted at this point that the sensors disposed in the support of the hook device of WO 2012/106826 can also be repositioned longitudinally and transversely with respect to the support, thus rendering a weight measurement in hook device 71 particularly simple. The weight of the container is then recorded in a weighing window, in which the front end thereof, held by hook device 71, is suspended a few centimeters over the loading surface, which can be determined by the position of the hook device or by a proximity switch attached appropriately by a person skilled in the art.

In summary, the present invention also a lorry with at least one load bearing structure for a container to be transported, wherein a roller is provided for the container in the loadable section of the at least one load bearing structure, and the measuring section is supported on the chassis of the lorry. Also provided are a hook device comprising a sensor for a force acting on the hook, which in turn generates a load signal that varies according to the force acting on the hook, and preferably a computer that evaluates the load signals from the sensors and assigns weight of the container thereto.

In an embodiment of the present invention not shown in the figures, the load bearing structures support rollers for a cable of a cableway, so that the current load on the wheels can be recorded in real time. The load acting on a deflection wheel in a mountain or valley station can also be recorded in real time in the same way.

The invention claimed is:

1. An elastically deformable load bearing structure comprising:
   a measuring arrangement for measuring a magnitude of a load acting on the load bearing structure in a loadable section;
   a mechanical transmission element that extends from the loadable section to a measurement section of the load bearing structure and cooperates operatively with a sensor which is arranged in the measurement section; and
   wherein the mechanical transmission element is constructed as a pivotable rocker supported by a rocker bearing positioned inside a length of the transmission element.

2. The load bearing structure according to claim 1, wherein a deformation section is provided between the loadable section and the measuring section, and this deformation section is elastically deformed during operation under effect of load, causing a relative displacement between loadable section and the measuring section.

3. The load bearing structure according to claim 1, wherein the transmission element is constructed as an elongated body, preferably as a rod, which particularly preferably protrudes through the load bearing structure.

4. The load bearing structure according to claim 1, wherein the rocker bearing is a ball bearing on which the transmission element is supported, and wherein the ball bearing preferably engages in a recess in the transmission element.

5. The load bearing structure according to claim 1, wherein the rocker bearing has a bending spring that protrudes through the transmission element and by deflection of the bending spring allows rocker movement of the mechanical transmission element.

6. The load bearing structure according to claim 1, wherein the transmission element has a mechanical filter for bending moments, in such manner that in operation only shearing forces corresponding to the load are transmitted from the section for detecting the load to the measuring section.

7. The load bearing structure according to claim 6, wherein the mechanical filter has a weak point in the transmission element, which allows elastic bucking of the transmission element.

8. The load bearing structure according to claim 7, wherein the weak point has a thickness-reduced section in the transmission element, and wherein the thickness-reduced section is preferably located in an area of a neutral axis of the mechanical transmission element when viewed in a direction of load application.

9. The load bearing structure according to claim 7, wherein the weak point has two recesses arranged opposite to one another and preferably having the form of slots.

10. The load bearing structure according to claim 1, wherein the transmission element is clamped in the loadable section.

11. A lorry having at least one load bearing structure according to claim 1 for a container to be transported, wherein a roller is provided for the container in the loadable section of the at least one load bearing structure, and the measuring section is supported on a chassis of the lorry.

12. The lorry according to claim 11, wherein a hook device comprising a sensor for measuring a force acting on the hook, the sensor in turn generates a load signal that varies according to the force acting on the hook, and preferably a computer is provided that evaluates the load signals from the sensors and assigns a weight of the container thereto.

13. A cableway with a roller or a deflection wheel and a cableway cable running thereon, wherein a load bearing structure according to claim 1 supports the roller or the deflection wheel.

14. An elastically deformable load bearing structure comprising:
   a measuring arrangement for a measuring magnitude of a load acting on the load bearing structure in a loadable section,
   a mechanical transmission element that extends from the loadable section to a measurement section of the load bearing structure and cooperates operatively with a sensor which is arranged in the measurement section; and
   wherein the mechanical transmission element has a mechanical filter for filtering bending moments, in such manner that in operation only shearing forces corresponding to the load are transmitted from the section for detecting the load to the measuring section.

* * * * *